United States Patent
Chundrlik, Jr. et al.

(10) Patent No.: US 10,406,981 B2
(45) Date of Patent: Sep. 10, 2019

(54) VEHICLE VISION SYSTEM WITH CURVATURE ESTIMATION

(71) Applicant: MAGNA ELECTRONICS INC., Auburn Hills, MI (US)

(72) Inventors: William J. Chundrlik, Jr., Rochester Hills, MI (US); Marc Wimmershoff, Foster City, CA (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 783 days.

(21) Appl. No.: 14/663,502

(22) Filed: Mar. 20, 2015

(65) Prior Publication Data
US 2015/0266422 A1   Sep. 24, 2015

Related U.S. Application Data

(60) Provisional application No. 61/955,831, filed on Mar. 20, 2014.

(51) Int. Cl.
| | | |
|---|---|---|
| *B60R 1/00* | (2006.01) | |
| *G06K 9/00* | (2006.01) | |
| *G01S 19/45* | (2010.01) | |
| *G01S 19/39* | (2010.01) | |

(52) U.S. Cl.
CPC ............... *B60R 1/00* (2013.01); *G01S 19/39* (2013.01); *G01S 19/45* (2013.01); *G06K 9/00798* (2013.01); *B60R 2300/302* (2013.01); *B60R 2300/804* (2013.01); *B60R 2300/8086* (2013.01)

(58) Field of Classification Search
CPC ............. B60R 1/00; B60R 2300/8086; B60R 2300/302; B60R 2300/804; G06K 9/00798; G01S 19/45; G01S 19/39
See application file for complete search history.

(56) References Cited

U.S. PATENT DOCUMENTS

| | | |
|---|---|---|
| 5,255,442 A | 10/1993 | Schierbeek et al. |
| 5,550,677 A | 8/1996 | Schofield et al. |
| 5,632,092 A | 5/1997 | Blank et al. |
| 5,670,935 A | 9/1997 | Schofield et al. |
| 5,752,065 A | 5/1998 | Stagier et al. |
| 5,796,094 A | 8/1998 | Schofield et al. |

(Continued)

FOREIGN PATENT DOCUMENTS

WO   WO 2013149149 A1 * 10/2013 ............. G01S 19/49

*Primary Examiner* — Frederick D Bailey
*Assistant Examiner* — Jill D Sechser
(74) *Attorney, Agent, or Firm* — Honigman LLP

(57) ABSTRACT

A vision system of a vehicle includes a camera disposed at a vehicle and having a field of view forward of the vehicle and operable to capture image data. A vehicle-based GPS system is operable to determine a geographical location of the vehicle. A control includes an image processor operable to process image data captured by the camera. Responsive at least in part to processing of captured image data by the image processor to determine lane markings and responsive at least in part to the GPS system and responsive at least in part to map data mapping the road along which the vehicle is traveling, the control is operable to determine an enhanced estimation of the path of travel of the vehicle. The enhanced estimation may be based on reliability levels or weighting factors of the determined lane markings and the map data.

20 Claims, 5 Drawing Sheets

(56) References Cited

U.S. PATENT DOCUMENTS

| | | |
|---|---|---|
| 5,877,897 A | 3/1999 | Schofield et al. |
| 5,924,212 A | 7/1999 | Domanski |
| 5,949,331 A | 9/1999 | Schofield et al. |
| 6,292,718 B2 | 9/2001 | Staiger |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,477,464 B2 | 11/2002 | McCarthy et al. |
| 6,498,620 B2 | 12/2002 | Schofield et al. |
| 6,571,136 B1 | 5/2003 | Staiger |
| 6,628,441 B1 | 9/2003 | Staiger |
| 6,629,033 B2 | 9/2003 | Preston et al. |
| 6,654,910 B1 | 11/2003 | Eibach et al. |
| 6,678,614 B2 | 1/2004 | McCarthy et al. |
| 6,690,268 B2 | 2/2004 | Schofield et al. |
| 6,778,073 B2 | 8/2004 | Lutter et al. |
| 6,806,452 B2 | 10/2004 | Bos et al. |
| 6,824,281 B2 | 11/2004 | Schofield et al. |
| 6,946,978 B2 | 9/2005 | Schofield |
| 6,950,312 B2 | 9/2005 | Staiger |
| 6,952,782 B2 | 10/2005 | Staiger |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,123,168 B2 | 10/2006 | Schofield |
| 7,140,026 B2 | 11/2006 | Staiger |
| 7,146,260 B2 | 12/2006 | Preston et al. |
| 7,167,796 B2 | 1/2007 | Taylor et al. |
| 7,178,049 B2 | 2/2007 | Lutter |
| 7,205,904 B2 | 4/2007 | Schofield |
| 7,349,844 B2 | 3/2008 | Staiger |
| 7,355,524 B2 | 4/2008 | Schofield |
| 7,412,328 B2 | 8/2008 | Uhlmann et al. |
| 7,474,963 B2 | 1/2009 | Taylor et al. |
| 7,777,611 B2 | 8/2010 | Desai |
| 8,086,771 B2 | 12/2011 | Staiger et al. |
| 8,625,778 B2 | 1/2014 | Jung et al. |
| 8,694,224 B2 | 4/2014 | Chundrlik, Jr. et al. |
| 9,036,026 B2 | 5/2015 | Dellantoni et al. |
| 9,260,095 B2 | 2/2016 | Chundrlik, Jr. et al. |
| 9,264,673 B2 | 2/2016 | Chundrlik, Jr. et al. |
| 2005/0154475 A1 | 7/2005 | Forchert et al. |
| 2007/0118280 A1 | 5/2007 | Uhlmann et al. |
| 2008/0007618 A1 | 1/2008 | Yuasa |
| 2008/0046150 A1 | 2/2008 | Breed |
| 2008/0174453 A1 | 7/2008 | Schofield |
| 2008/0192984 A1 | 8/2008 | Higuchi et al. |
| 2009/0118994 A1* | 5/2009 | Mori ............... G06K 9/00798 701/117 |
| 2010/0191461 A1* | 7/2010 | Zeng ............... B60W 40/076 701/532 |
| 2011/0320163 A1* | 12/2011 | Markkula ......... B60W 40/076 702/150 |
| 2012/0062743 A1 | 3/2012 | Lynam et al. |
| 2014/0032100 A1* | 1/2014 | Park, II ............ G01C 21/30 701/446 |
| 2015/0260530 A1* | 9/2015 | Stenborg ........... G01C 21/30 701/461 |

\* cited by examiner

VEHICLE VISION SYSTEM WITH CURVATURE ESTIMATION

CROSS REFERENCE TO RELATED APPLICATION

The present application is related to U.S. provisional application Ser. No. 61/955,831, filed Mar. 20, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system or driver assistance system for a vehicle that utilizes one or more cameras (preferably one or more CMOS cameras) to capture image data representative of images exterior of the vehicle, and provides for incorporation of camera and digital map data based weighting factors for road curvature calculation in order to reduce errors associated with the calculations of driver assistance systems, such as, for example, lane departure warning systems, lane keeping systems, lane centering systems and/or the like. The system of the present invention may use data captured by or provided by the camera system, a GPS antenna or system with a processing box that includes map data, a yaw rate detection system and a vehicle speed sensor, and the system may weight data received or captured by the various sensors in determining which data to use or not use in determining the curvature of the path of travel of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward (or rearward) direction. The vision system includes an image processor or image processing system that is operable to receive image data from one or more cameras and optionally, the system or camera may provide an output to a display device for displaying images representative of the captured image data. Optionally, the display device may provide a top down or bird's eye or surround view display and may provide a displayed image that is representative of the subject vehicle, and optionally with the displayed image being customized to at least partially correspond to the actual subject vehicle.

Figure 1:
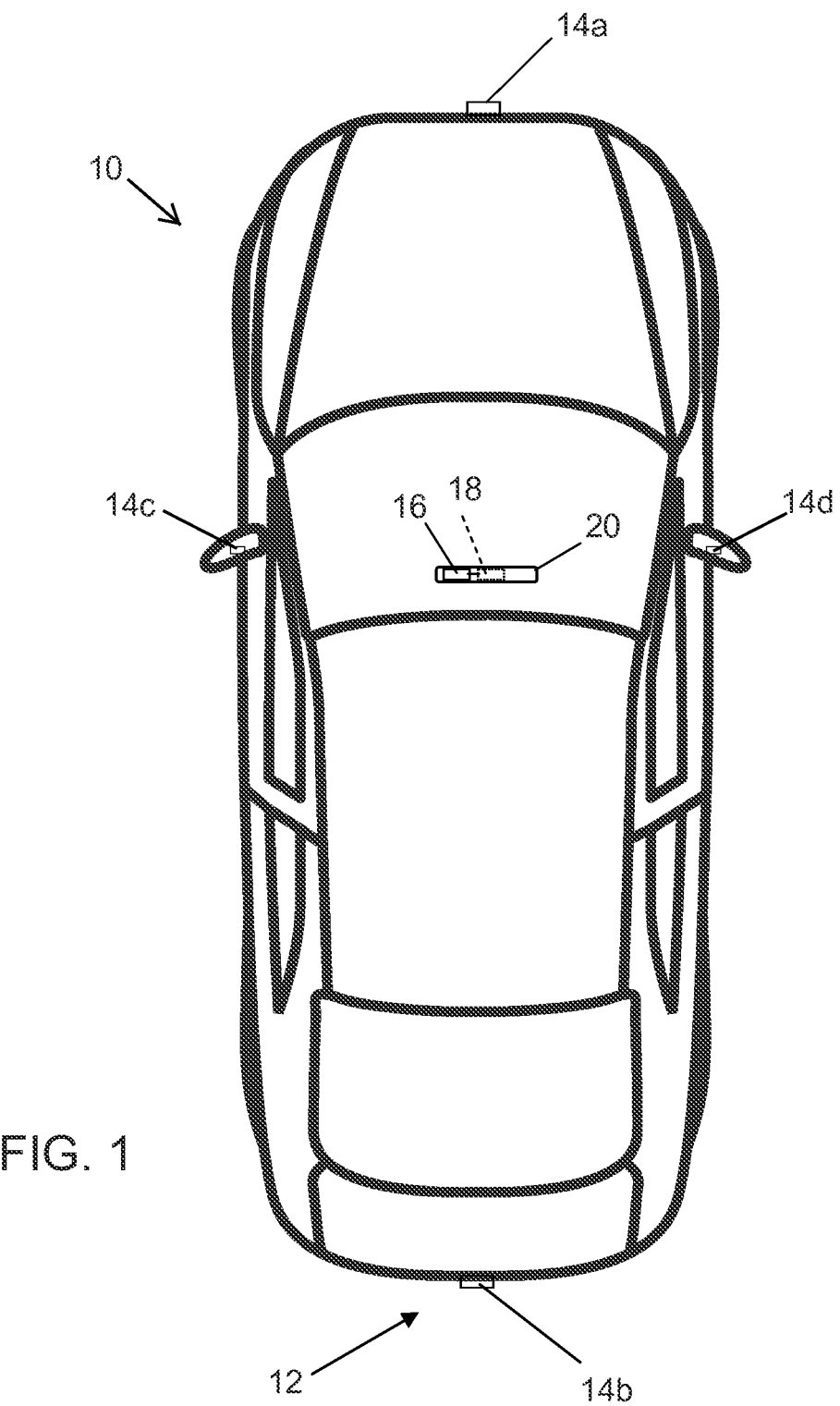
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a forward facing imaging sensor or camera 14a (and the system may optionally include multiple exterior facing imaging sensors or cameras, such as a rearwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras. Optionally, an output of the system or the camera or cameras may be provided or generated for use in displaying images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many types of driver assistance systems require information regarding the location and motion of the subject or equipped vehicle and preceding vehicles and the environment of the roadway along which these vehicles are traveling. Calculating the path of these vehicles is necessary to determine if the subject vehicle's projected path will result in intersecting a path of a preceding vehicle of interest. If the subject vehicle path prediction is not correctly or accurately determined, the result may be an incorrect determination that a preceding vehicle of interest is in the path of the subject vehicle.

Many techniques can be used to determine the path of a subject vehicle. These techniques can utilize vehicle dynamics sensors such as yaw rate, lateral acceleration, steering wheel position and vehicle speed and the like. Also, the path of the subject vehicle and the presence of a preceding vehicle can be determined utilizing a camera detecting lane markings and preceding vehicles. The road environment can be assessed utilizing GPS data linked with navigation data. All of these methods are subject to errors due to, for example, sensor drift and offset, missing or covered lane markings, atmospheric and multipath affects associated with GPS data received from multiple satellites, and/or the like.

The present invention provides for linking of data output from multiple disparate sensing technologies to reduce the errors associated with determining the path of the subject and preceding vehicles. For example, camera curvature and heading can be used to correct the curvature determined from GPS/map database and vice versa corrected GPS/map determined road curvature can be used in situations where the lane markings are temporarily not visible or disappeared (and optionally image data captured by a rearward viewing camera can be used to determine lane markings when lane markings are temporarily not viewable to the forward viewing camera). Utilizing multiple independent methods to determine the subject vehicle trajectory and fusing the result into one curvature result provides a robust method to determine the actual trajectory of the subject and preceding vehicle. This data can be used to enhance the operation of many automotive features, such as, for example, automatic emergency braking to avoid collisions, vehicle following systems, automatic lane changes, automated driving vehicles and/or the like.

Figure 2:
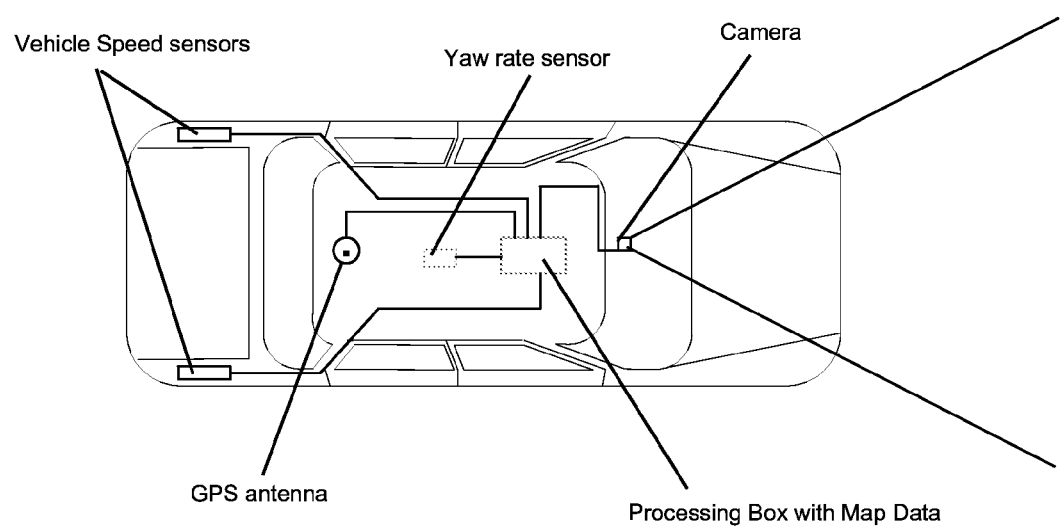
FIG. 2 is a plan view of another vehicle with a vision system of the present invention, including sensors used for the camera and digital map data fusion.

The present invention provides for incorporation of camera and digital map data based weighting factors for road curvature calculation in order to reduce errors associated with the calculations of driver assistance systems, such as, for example, lane departure warning systems, lane keeping systems, lane centering systems and/or the like. Sensors used within or by the system of the present invention are shown in FIG. 2. Besides the camera system, a GPS antenna with a processor or processing box that includes map data, a yaw rate sensor and a vehicle speed sensor are used.

Figure 3:
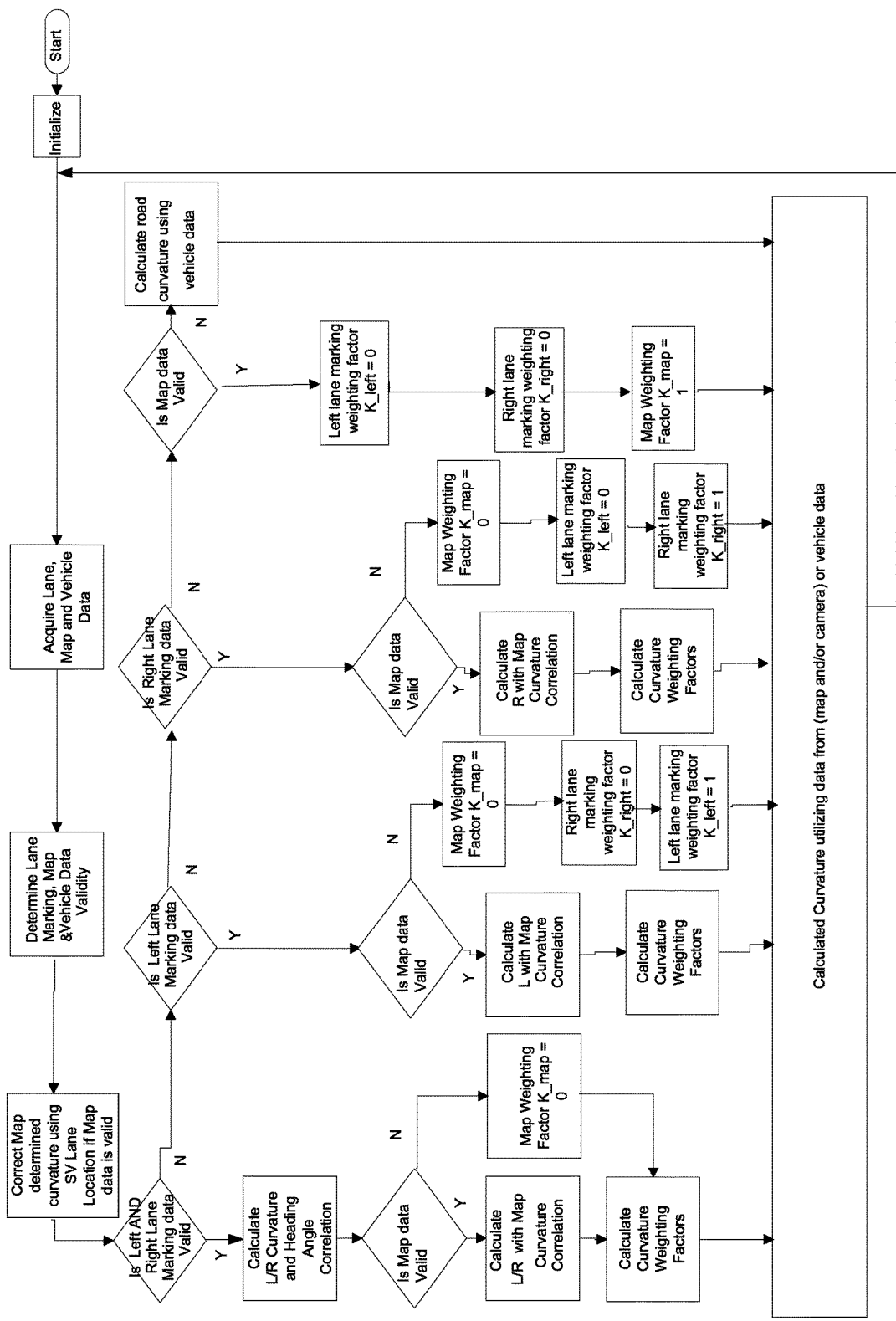
FIG. 3 is a flow chart of the camera and map data fusion of the present invention.

The determination of the road curvature ahead of the subject vehicle is typically determined by a camera system with an image processor that processes image data captured by the forward viewing camera and detects lane markings in front of the vehicle. Due to the measurement principle itself and due to environmental conditions, the optical detection of the lane markings, and with this the determination of the road curvature ahead, may be distorted. This circumstance leads to a false or misbehavior of underlying driver assistance systems, which take the curvature signal into account. To reduce these false or misbehaviors, a fused curvature value is calculated by utilizing digital map data and weighting factors. Therefore, a redundant curvature signal is determined by means of positioning techniques (e.g. GPS, GLONASS, GALILEO) in combination with digital map data. The process of the present invention is described in detail below and is shown in FIG. 3.

Figure 4:
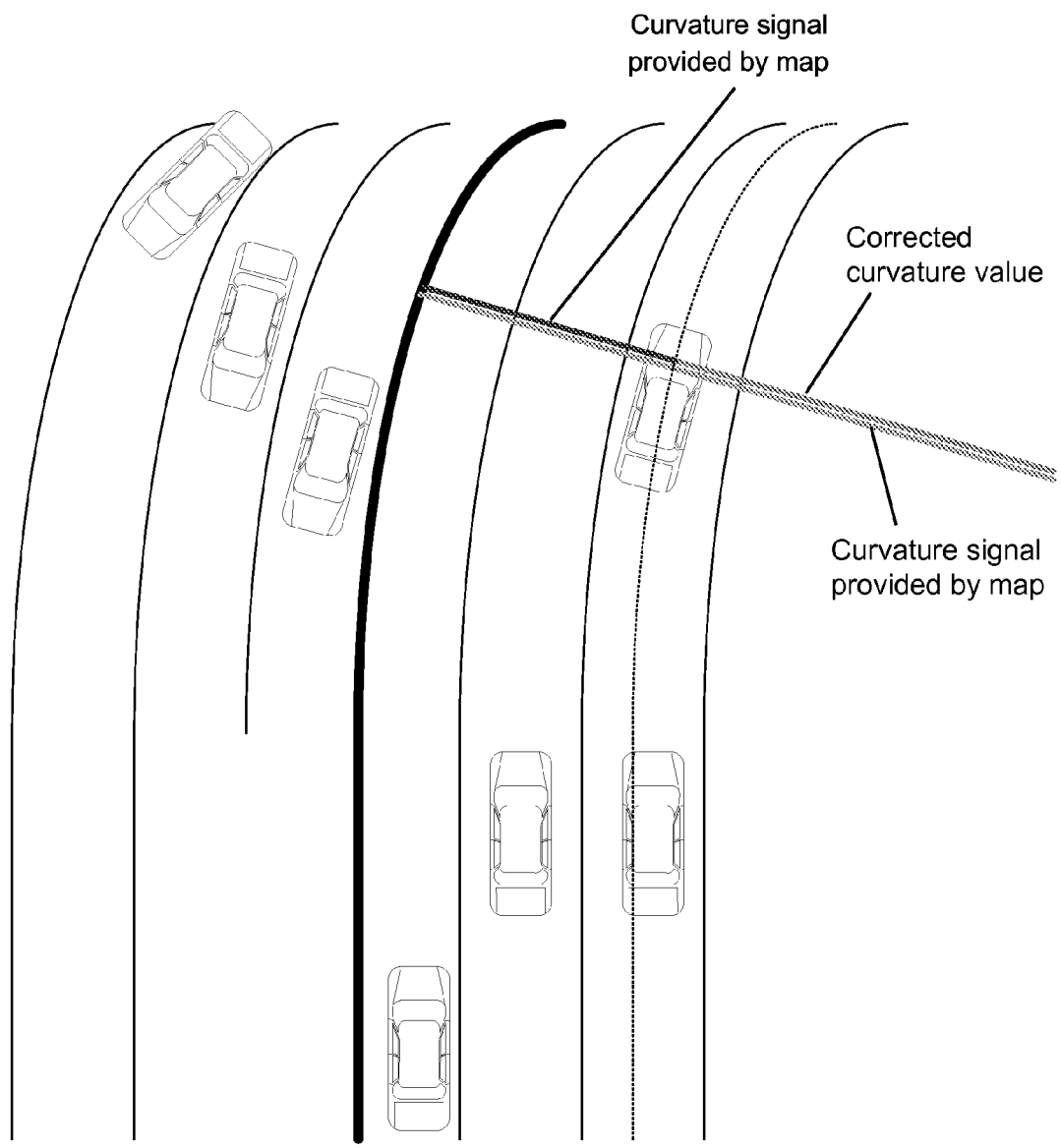
FIG. 4 is a schematic showing map curvature correction in accordance with the present invention.

After an initialization of the measurement systems and all variables, the system acquires lane, map and vehicle data and the validity of the signals are checked (i.e., the system determines if the reliability or confidence of the lane marking determinations and map or location determination is above or below a threshold level). In situations where the vehicle is traveling along a road with multiple lanes, the map-based curvature signal is typically referred to the middle of the road. The camera system provides information about the number of lanes of the road and in which lane the vehicle is traveling. With this information, a curvature correction value is calculated (see curvature correction value in FIG. 4) and the map-based curvature signal is corrected to the curvature of the lane in which the vehicle is driving. For a better understanding, this procedure is illustrated in FIG. 4, where the curvature information provided by the map system is generally along the center of the road, whereby the system, when the vehicle is traveling along an inner lane of the curve, corrects the curvature to an inner curvature to more accurately reflect the road curvature along which the vehicle is traveling.

In future digital maps, the number of lanes may be part of the map database. Thus, this information can also be used to correct any errors in the map-based curvature signal according to the procedure explained above.

If the camera system is able to deliver valid lane marking data for the left and right lane marking, the correlation between the determined left and right lane marking's curvature $c_0^{cam}$ and heading angle $\gamma^{cam}$ is calculated by means of equations (1) and (2). The use of the heading angle correlation is not mandatory but it delivers a further indicator of the camera based lane marking detection quality.

$$\Delta c_{0,left\ right}^{cam} = c_{0,left}^{cam} - c_{0,right}^{cam} \tag{1}$$

$$\Delta \gamma_{left\ right}^{cam} = \gamma_{left}^{cam} - \gamma_{right}^{cam} \tag{2}$$

If the positioning system is in combination with digital map data that provides valid curvature information, the correlation between the determined left and right lane markings with the corrected map based curvature signal $c_0^{map,cor}$ is calculated by means of equations (3) and (4).

$$\Delta c_{0,left}^{cam\ map} = c_{0,left}^{cam} - c_0^{map,cor} \tag{3}$$

$$\Delta c_{0,right}^{cam\ map} = c_{0,right}^{cam} - c_0^{map,cor} \tag{4}$$

By means of differentiating the curvature signal over distance traveled (s), the change of curvature signal can be calculated on the basis of two curvature measurements at point in time (k−1) and (k) (see equation (5) below). The distance traveled can also be expressed as vehicle velocity (v) times time (t).

$$c_1 = \frac{c_{0,k} - c_{0,k-1}}{s} = \frac{c_{0,k} - c_{0,k-1}}{v \cdot t} \tag{5}$$

If the change of curvature information $c_1$ from map and camera data is available and valid, the correlation of these signals is calculated in analogy to the curvature signal. See equations (6) and (7):

$$\Delta c_{1,left}^{cam\ map} = c_{1,left}^{cam} - c_1^{map,cor} \tag{6}$$

$$\Delta c_{1,right}^{cam\ map} = c_{1,right}^{cam} - c_1^{map,cor} \tag{7}$$

Figure 5:
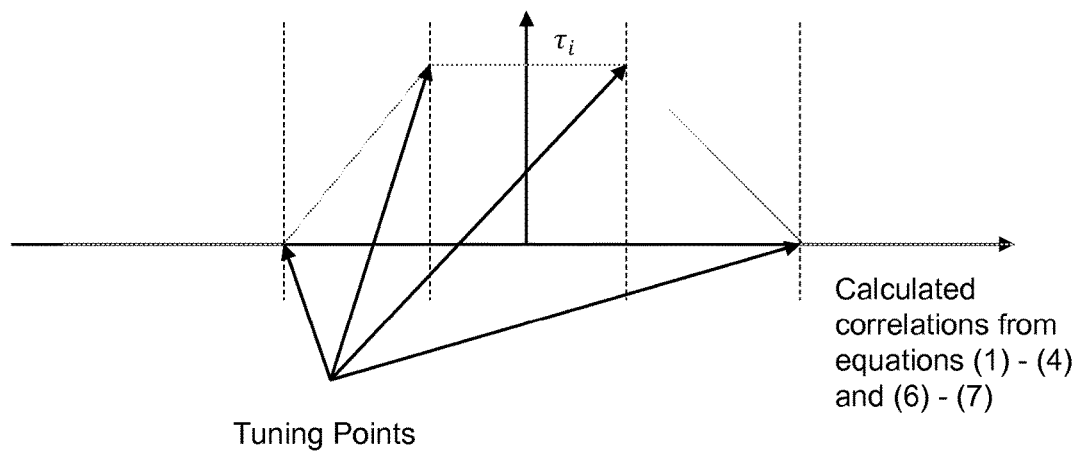
FIG. 5 is a graph showing the determination of weighting factors by the system of the present invention.

Each calculated correlation (equations (1) to (4) and (6) to (7)) is then transformed to an individual weighting factor $\tau_i$ by means of the graph shown in FIG. 5 (one graph per calculated difference).

It should be noted that the function in between of the tuning points does not to be necessarily linear as shown in the graph (FIG. 5). Further geometric functions are possible.

Based on the individual weighting factors $\tau_i$, the resulting weighting factors for left and right lane marking curvature signals and map based curvature signals are calculated by equations (8), (9) and (10):

$$K_{left} = \tau_1 \cdot \Delta c_{0,left\ right}^{cam} + \tau_2 \cdot \Delta \gamma_{left\ right}^{cam} + \tau_3 \cdot \Delta c_{0,left}^{cam\ map} + \tau_4 \cdot \Delta c_{1,left}^{cam\ map} \tag{8}$$

$$K_{right} = \tau_1 \cdot \Delta c_{0,left\ right}^{cam} + \tau_2 \cdot \Delta \gamma_{left\ right}^{cam} + \tau_5 \cdot \Delta c_{0,right}^{cam\ map} + \tau_6 \cdot \Delta c_{1,right}^{cam\ map} \tag{9}$$

$$K_{map} = \tau_3 \cdot \Delta c_{0,left}^{cam\ map} + \tau_4 \cdot \Delta c_{1,left}^{cam\ map} + \tau_5 \cdot \Delta c_{0,right}^{cam\ map} + \tau_6 \cdot \Delta c_{1,right}^{cam\ map} \tag{10}$$

If no valid map data is available, the weighting factor for map curvature $K_{map}$ is set to zero. Finally, the fused curvature is then calculated by equation (11).

$$c_0^{fused} = \frac{K_{left}}{K_{left} + K_{right} + K_{map}} \cdot c_{0,left}^{cam} + \frac{K_{right}}{K_{left} + K_{right} + K_{map}} \cdot c_{0,right}^{cam} + \frac{K_{map}}{K_{left} + K_{right} + K_{map}} \cdot c_0^{map} \quad (11)$$

If the camera system delivers valid lane marking data for the left side but not for the right side and map data is valid, the correlation between the curvature of the determined left lane marking and the map based curvature is calculated by means of equation (3). The same is done for the change of curvature signal correlation by means of equation (6). Afterwards, for these two values the individual weighting factors ($\tau$) are calculated. All other individual weighting factors are set to zero. Consistent with the already described process, the resulting weighting factors $K_{left}$, $K_{right}$ and $K_{map}$ are then calculated by equations (8), (9) and (10) and the fused curvature is determined by equation (11).

In situations where there is valid left lane marking data but invalid map data, the resulting weighting factors are set to $K_{left}=1$, $K_{right}=0$ and $K_{map}=0$. Afterwards, the resulting curvature signal is calculated by equation (11).

If the camera system delivers valid lane marking data for the right side lane marking but not for the left side lane marking, the before mentioned procedure is executed in the same way but only for the right side lane marking instead of the left side lane marking.

If the camera system does not deliver valid lane marking data for left and right side lane markings but the map data is valid, the resulting weighting factors will be set to $K_{left}=0$, $K_{right}=0$ and $K_{map}=1$. Subsequently, the resulting curvature signal is calculated by equation (11).

In case of invalid data from camera and map system, the road curvature is calculated by utilizing vehicle data (velocity divided by yaw rate).

Thus, the present invention provides a system that is operable to provide a more accurate determination of the curvature of the road along which the vehicle is traveling, in order to provide a more accurate determination when a predicted or projected path of the equipped or subject vehicle will intersect a predicted or projected path of another vehicle traveling along the same road as the equipped vehicle (and in the same lane or in a different lane as that of the equipped vehicle). The system is operable to process captured image data (as captured by a forward facing camera of the vehicle) and to utilize data captured by or received from at least one other sensor of the vehicle (such as a GPS sensor and map/navigation system of the equipped vehicle and a yaw rate sensor and speed sensor of the equipped vehicle).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686; and/or WO 2013/016409, and/or U.S. Publication Nos. US-2010-0020170 and/or US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication Nos. US-2006-0061008 and/or US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249; and/or WO 2013/109869, and/or U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
   a camera disposed at a vehicle equipped with said vision system, wherein said camera has a field of view forward of the equipped vehicle and is operable to capture image data;
   a vehicle-based GPS system operable to determine a geographical location of the equipped vehicle;
   a control including an image processor;
   wherein said image processor processes image data captured by said camera;
   wherein, responsive at least in part to processing of captured image data, said control is operable to determine (i) left lane markings along a left side of a lane in which the equipped vehicle is traveling on a road and (ii) right lane markings along a right side of the lane in which the equipped vehicle is traveling on the road;
   wherein, responsive at least in part to said GPS system determining the geographic location of the equipped vehicle, said vision system generates a map-based road curvature for the road ahead of the equipped vehicle based on map data;
   wherein, responsive at least in part to processing of captured image data by said image processor, said control determines a particular lane in which the equipped vehicle is traveling from a plurality of lanes of the road and generates a camera-based road curvature for the road ahead of the equipped vehicle;
   wherein, responsive to generation of the map-based road curvature and the camera-based road curvature, said control fuses the map-based road curvature and the camera-based road curvature;
   wherein, responsive to fusing of the map-based road curvature and the camera-based road curvature, said control is operable to estimate an actual road curvature of the road ahead of the equipped vehicle; and
   wherein, in fusing of map-based road curvature and camera-based road curvature, said control diminishes weight of the camera-based road curvature when reliability level is below a threshold level for at least one selected from the group consisting of (i) the determined left lane markings and (ii) the determined right lane markings; and
   wherein, in fusing of map-based road curvature and camera-based road curvature, said control diminishes weight of the map-based road curvature when reliability level is below a threshold level for the map data.

2. The vision system of claim 1, wherein, responsive to determined reliability levels, said control determines weighting factors for (i) the determined left lane markings, (ii) the determined right lane markings and (iii) the map-based road curvature.

3. The vision system of claim 2, wherein, responsive at least in part to determined weighting factors, said control estimates the actual road curvature of the road ahead of the equipped vehicle along the particular lane in which the equipped vehicle is traveling.

4. The vision system of claim 3, wherein, responsive to a determination that the map data used in generating the map-based road curvature is compromised, said control determines a higher weighting factor for at least one selected from the group consisting of (i) the determined left lane markings and (ii) the determined right lane markings.

5. The vision system of claim 4, wherein, responsive to a determination that the map data used in generating the map-based road curvature is invalid, said control estimates the actual road curvature of the road ahead of the equipped vehicle along the particular lane in which the equipped vehicle is traveling without use of the map data.

6. The vision system of claim 3, wherein, responsive to a determination that the left lane markings determination is compromised, said control determines a higher weighting factor for at least one selected from the group consisting of (i) the determined right lane markings and (ii) the map-based road curvature.

7. The vision system of claim 6, wherein, responsive to a determination that the left lane markings determination is invalid, said control estimates the actual road curvature of the road ahead of the equipped vehicle along the particular lane in which the equipped vehicle is traveling without use of the left lane markings determination.

8. The vision system of claim 3, wherein, responsive to a determination that the right lane markings determination is compromised, said control determines a higher weighting factor for at least one selected from the group consisting of (i) the determined left lane markings and (ii) the map-based road curvature.

9. The vision system of claim 8, wherein, responsive to a determination that the right lane markings determination is invalid, said control estimates the actual road curvature of the road ahead of the equipped vehicle along the particular lane in which the equipped vehicle is traveling without use of the right lane markings determination.

10. The vision system of claim 1, wherein, responsive to a determination that a reliability level is below a threshold level for all of (i) the determined left lane markings, (ii) the determined right lane markings and (iii) the map data used to generate the map-based road curvature, said control determines an estimated path of travel of the equipped vehicle responsive at least in part to (i) a speed sensor of the equipped vehicle and (ii) a yaw rate sensor of the equipped vehicle.

11. A vision system of a vehicle, said vision system comprising:
    a camera disposed at a vehicle equipped with said vision system, wherein said camera has a field of view forward of the equipped vehicle and is operable to capture image data;
    a vehicle-based GPS system operable to determine a geographical location of the equipped vehicle;
    a control including an image processor;
    wherein said image processor processes image data captured by said camera;
    wherein, responsive at least in part to processing of captured image data, said control is operable to determine (i) left lane markings along a left side of a lane in which the equipped vehicle is traveling on a road and (ii) right lane markings along a right side of the lane in which the equipped vehicle is traveling on the road;
    wherein, responsive at least in part to said GPS system determining the geographic location of the equipped vehicle, said vision system generates a map-based road curvature for the road ahead of the equipped vehicle based on map data;
    wherein, responsive at least in part to processing of captured image data by said image processor, said control determines a particular lane in which the equipped vehicle is traveling from a plurality of lanes of the road and generates a camera-based road curvature for the road ahead of the equipped vehicle;
    wherein, responsive to generation of the map-based road curvature and the camera-based road curvature, said control fuses the map-based road curvature and the camera-based road curvature;
    wherein, responsive to fusing of the map-based road curvature and the camera-based road curvature, said control is operable to estimate an actual road curvature of the road ahead of the equipped vehicle;
    wherein, responsive to determined reliability levels of (i) the determined left lane markings, (ii) the determined right lane markings and (iii) the map data used to generate the map-based road curvature, said control determines weighting factors for (i) the camera-based road curvature and (ii) the map-based road curvature;
    wherein, responsive at least in part to determined weighting factors, said control estimates the actual road curvature of the road ahead of the equipped vehicle along the particular lane in which the equipped vehicle is traveling based on the weighted (i) camera-based road curvature and (ii) map-based road curvature;
    wherein, in fusing of map-based road curvature and camera-based road curvature, said control diminishes the weighting factor of the camera-based road curvature when reliability level is below a threshold level for at least one selected from the group consisting of (i) the determined left lane markings and (ii) the determined right lane markings; and
    wherein, in fusing of map-based road curvature and camera-based road curvature, said control diminishes the weighting factor of the map-based road curvature when reliability level is below a threshold level for the map data.

12. The vision system of claim 11, wherein, responsive to a determination that the map data used in generating the map-based road curvature is compromised, said control determines a higher weighting factor for at least one selected from the group consisting of (i) the determined left lane markings and (ii) the determined right lane markings.

13. The vision system of claim 12, wherein, responsive to a determination that the map data used in generating the map-based road curvature is invalid, said control estimates the actual road curvature of the road ahead of the equipped vehicle along the particular lane in which the equipped vehicle is traveling without use of the map data.

14. The vision system of claim 11, wherein, responsive to a determination that the left lane markings determination is compromised, said control determines a higher weighting factor for the map-based road curvature.

15. The vision system of claim 14, wherein, responsive to a determination that the left lane markings determination is invalid, said control estimates the actual road curvature of the road ahead of the equipped vehicle along the particular lane in which the equipped vehicle is traveling without use of the left lane markings determination.

16. The vision system of claim 11, wherein, responsive to a determination that the right lane markings determination is compromised, said control determines a higher weighting factor for the map-based road curvature.

17. The vision system of claim 16, wherein, responsive to a determination that the right lane markings determination is invalid, said control estimates the actual road curvature of the road ahead of the equipped vehicle along the particular lane in which the equipped vehicle is traveling without use of the right lane markings determination.

18. The vision system of claim 11, wherein, responsive to a determination that a reliability level is below a threshold level for all of (i) the determined left lane markings, (ii) the determined right lane markings and (iii) the map data used to generate the map-based road curvature, said control determines an estimated path of travel of the equipped vehicle responsive at least in part to (i) a speed sensor of the equipped vehicle and (ii) a yaw rate sensor of the equipped vehicle.

19. A vision system of a vehicle, said vision system comprising:
    a camera disposed at a vehicle equipped with said vision system, wherein said camera has a field of view forward of the equipped vehicle and is operable to capture image data;
    a vehicle-based GPS system operable to determine a geographical location of the equipped vehicle;
    a control including an image processor;
    wherein said image processor processes image data captured by said camera;
    wherein, responsive at least in part to processing of captured image data, said control is operable to determine (i) left lane markings along a left side of a lane in which the equipped vehicle is traveling on a road and (ii) right lane markings along a right side of the lane in which the equipped vehicle is traveling on the road;
    wherein, responsive at least in part to said GPS system determining the geographic location of the equipped vehicle, said vision system generates a map-based road curvature for the road ahead of the equipped vehicle based on map data;

wherein, responsive at least in part to processing of captured image data by said image processor, said control determines a particular lane in which the equipped vehicle is traveling from a plurality of lanes of the road and generates a camera-based road curvature for the road ahead of the equipped vehicle;

wherein, responsive to generation of the map-based road curvature and the camera-based road curvature, said control fuses the map-based road curvature and the camera-based road curvature;

wherein, responsive to fusing of the map-based road curvature and the camera-based road curvature, said control is operable to estimate an actual road curvature of the road ahead of the equipped vehicle;

wherein, responsive to determined reliability levels of (i) the determined left lane markings, (ii) the determined right lane markings and (iii) the map data used to generate the map-based road curvature, said control determines weighting factors for (i) the determined left lane markings, (ii) the determined right lane markings and (iii) the map-based road curvature;

wherein, responsive at least in part to determined weighting factors, said control estimates the actual road curvature of the road ahead of the equipped vehicle along the particular lane in which the equipped vehicle is traveling based on the weighted (i) determined left lane markings, (ii) determined right lane markings and (iii) map-based road curvature;

wherein, in fusing of map-based road curvature and camera-based road curvature, said control diminishes the weighting factor of the camera-based road curvature when reliability level is below a threshold level for at least one selected from the group consisting of (i) the determined left lane markings and (ii) the determined right lane markings; and wherein, in fusing of map-based road curvature and camera-based road curvature, said control diminishes the weighting factor of the map-based road curvature when reliability level is below a threshold level for the map data;

wherein, responsive to a determination that the map data used to generate the map-based road curvature is invalid, said control estimates the actual road curvature of the road ahead of the equipped vehicle along the particular lane in which the equipped vehicle is traveling without use of the map data;

wherein, responsive to a determination that the left lane markings determination is invalid, said control estimates the actual road curvature of the road ahead of the equipped vehicle along the particular lane in which the equipped vehicle is traveling without use of the left lane markings determination;

wherein, responsive to a determination that the right lane markings determination is invalid, said control estimates the actual road curvature of the road ahead of the equipped vehicle along the particular lane in which the equipped vehicle is traveling without use of the right lane markings determination; and wherein, responsive to a determination that reliability level is below a threshold level for all of (i) the determined left lane markings, (ii) the determined right lane markings and (iii) the map data used to generate the map-based road curvature, said control determines an estimated path of travel of the equipped vehicle responsive at least in part to (i) a speed sensor of the equipped vehicle and (ii) a yaw rate sensor of the equipped vehicle.

20. The vision system of claim 19, wherein, responsive to a determination that the map data used to generate the map-based road curvature is compromised, said control determines a higher weighting factor for at least one selected from the group consisting of (i) the determined left lane markings and (ii) the determined right lane markings, and wherein, responsive to a determination that a left lane markings determination is compromised, said control determines a higher weighting factor for at least one selected from the group consisting of (i) the determined right lane markings and (ii) the map-based road curvature, and wherein, responsive to a determination that a right lane markings determination is compromised, said control determines a higher weighting factor for at least one selected from the group consisting of (i) the determined left lane markings and (ii) the map-based road curvature.

* * * * *

UNITED STATES PATENT AND TRADEMARK OFFICE
CERTIFICATE OF CORRECTION

PATENT NO. : 10,406,981 B2
APPLICATION NO. : 14/663502
DATED : September 10, 2019
INVENTOR(S) : William J. Chundrlik, Jr. et al.

It is certified that error appears in the above-identified patent and that said Letters Patent is hereby corrected as shown below:

In the Specification

Column 4
Formulas (1) and (2) listed at Lines 10-14 are shown as:

$$\Delta c_{0,left\ right}^{cam} = c_{0,left}^{cam} - c_{0,right}^{cam} \qquad (1)$$

$$\Delta \gamma_{left\ right}^{cam} = \gamma_{left}^{cam} - \gamma_{right}^{cam} \qquad (2)$$

But should be:

$$\Delta c_{0,left\ right}^{cam} = c_{0,left}^{cam} - c_{0,right}^{cam} \qquad (1)$$

$$\Delta \gamma_{left\ right}^{cam} = \gamma_{left}^{cam} - \gamma_{right}^{cam} \qquad (2)$$

Column 4
Formulas (3) and (4) listed at Lines 20-24 are shown as:

$$\Delta c_{0,left}^{cam\ map} = c_{0,left}^{cam} - c_{0}^{map,cor} \qquad (3)$$

$$\Delta c_{0,right}^{cam\ map} = c_{0,right}^{cam} - c_{0}^{map,cor} \qquad (4)$$

Signed and Sealed this
Fifteenth Day of October, 2019

Andrei Iancu
*Director of the United States Patent and Trademark Office*

But should be:

$$\Delta c_{0,left}^{cam\ map} = c_{0,left}^{cam} - c_0^{map,cor} \quad (3)$$

$$\Delta c_{0,right}^{cam\ map} = c_{0,right}^{cam} - c_0^{map,cor} \quad (4)$$

Column 4
Formulas (6) and (7) listed at Lines 40-44 are shown as:

$$\Delta c_{1,left}^{cam\ map} = c_{1,left}^{cam} - c_1^{map,cor} \quad (6)$$

$$\Delta c_{1,right}^{cam\ map} = c_{1,right}^{cam} - c_1^{map,cor} \quad (7)$$

But should be:

$$\Delta c_{1,left}^{cam\ map} = c_{1,left}^{cam} - c_1^{map,cor} \quad (6)$$

$$\Delta c_{1,right}^{cam\ map} = c_{1,right}^{cam} - c_1^{map,cor} \quad (7)$$

Column 4
Formulas (8), (9) and (10) listed at Lines 56-64 are shown as:

$$K_{left} = \tau_1 \cdot \Delta c_{0,left\ right}^{cam} + \tau_2 \cdot \Delta \gamma_{left\ right}^{cam} + \tau_3 \cdot \Delta c_{0,left}^{cam\ map} + \tau_4 \cdot \Delta c_{1,left}^{cam\ map} \quad (8)$$

$$K_{right} = \tau_1 \cdot \Delta c_{0,left\ right}^{cam} + \tau_2 \cdot \Delta \gamma_{left\ right}^{cam} + \tau_5 \cdot \Delta c_{0,right}^{cam\ map} + \tau_6 \cdot \Delta c_{1,right}^{cam\ map} \quad (9)$$

$$K_{map} = \tau_3 \cdot \Delta c_{0,left}^{cam\ map} + \tau_4 \cdot \Delta c_{1,left}^{cam\ map} + \tau_5 \cdot \Delta c_{0,right}^{cam\ map} + \tau_6 \cdot \Delta c_{1,right}^{cam\ map} \quad (10)$$

But should be:

$$K_{left} = \tau_1 \cdot \Delta c_{0,left\ right}^{cam} + \tau_2 \cdot \Delta \gamma_{left\ right}^{cam} + \tau_3 \cdot \Delta c_{0,left}^{cam\ map} + \tau_4 \cdot \Delta c_{1,left}^{cam\ map} \quad (8)$$

$$K_{right} = \tau_1 \cdot \Delta c_{0,left\ right}^{cam} + \tau_2 \cdot \Delta \gamma_{left\ right}^{cam} + \tau_5 \cdot \Delta c_{0,right}^{cam\ map} + \tau_6 \cdot \Delta c_{1,right}^{cam\ map} \quad (9)$$

$$K_{map} = \tau_3 \cdot \Delta c_{0,left}^{cam\ map} + \tau_4 \cdot \Delta c_{1,left}^{cam\ map} + \tau_5 \cdot \Delta c_{0,right}^{cam\ map} + \tau_6 \cdot \Delta c_{1,right}^{cam\ map} \quad (10)$$